3,707,446
METHOD FOR MEASURING THROWING POWER
Yoshiaki Oyabu, Kyoto, Nobuo Furuno, Amagasaki, Tomosabura Kawahara, Hirakata, and Hitoshi Kawai, Neyagawa, Japan, assignors to Nippon Paint Co., Ltd., Osaka, Japan
Original application July 18, 1969, Ser. No. 842,888. Divided and this application Oct. 13, 1971, Ser. No. 188,879
Claims priority, application Japan, July 20, 1968, 43/51,271, 43/51,272, 43/51,273
Int. Cl. B01k *5/02;* C23b *13/00*
U.S. Cl. 204—1 T                     4 Claims

ABSTRACT OF THE DISCLOSURE

The present invention relates to a method for measuring a throwing power in electrodeposition coating, by providing a small electrode of metal as an anode in the neighbourhood of, but separated through an electrodeposition coating solution from, a part of a material to be coated at which part a visual estimation of coating is difficult, said small electrode having a surface area sufficiently smaller than that of the material to be coated, electrodeposition-coating the small electrode simultaneously with coating the material to be coated, and measuring the current value at a peak detected by the small anode. By this method, it becomes possible to satisfactorily coat normally inaccessible surfaces of articles without visually assessing the coating by breaking the article.

CROSS-REFERENCES TO OTHER APPLICATIONS

Figure 1:
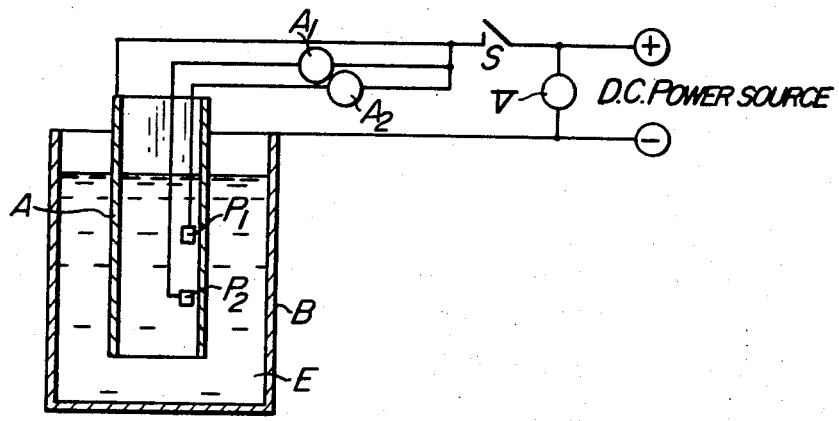

This is a division of our copending application Ser. No. 842,888 filed July 18, 1969 now abandoned.

The present invention relates to a method for measuring throwing power based on fresh information obtained from the clarification of the electrodeposition mechanism.

One of the most advantageous characteristics in electrodeposition coating is that normally inaccessible surfaces can be coated, for example, the inside surfaces of steel pipes, recessed parts of box-shaped structures, metal plates located next to one another, and hollow interiors. The extent to which an electrodeposition coating solution is capable of coating such inaccessible surfaces is called the throwing power, and can be achieved in complicated association of the arrangement of electrodes, the applied voltage, the coating period, the composition of paints and the electrodeposition coating temperature with one another. A quantitative relationship between these factors has not heretofore been discovered.

As the scale of throwing power, there have heretofore been proposed various methods from a practical point of view since a quantitative relationship between said scale and physical dimensions to be measured has not been known. Some examples of the methods are as follows:

(1) A method for observing the state of coating on the interior sides of two iron plates arranged in the shape of a wedge by placing one of the plates upon the other along one edge and keeping the other edges apart from each other and subjected to the electrodeposition using both plates as the anode of the cell.

(2) A method for observing the state of coating on several parallel iron plates which are arranged at the regular intervals and subjected to electrodeposition coating using one end of the series of iron plates as a cathode and the other end thereof as an anode.

(3) A method for evaluating the throwing power of a paint by means of the weight ratio of coating electrodeposited up on two anodes, one of which is placed in one part of an electrodeposition cell which is separated into two parts by a separator provided with a small hole at its center and the other anode is placed in the other part of the cell near the separator, the said other part having a cathode placed far from the separator, when the two anodes are subjected to electrodeposition coating.

(4) A method for evaluating the throwing power of a paint by means of the ratio of currents passing through two anodes having the same surface area placed at different distances from a cathode.

(5) A method in which a steel pipe is subjected to electrodeposition coating and then cut open, and the length of the coating deposited on the inner surface of the pipe in the axial direction is measured, by means of which length the throwing power of a paint is evaluated.

(6) A method in which a steel plate is placed within a steel pipe having the same length as the steel plate, the steel plate and the steel pipe are subjected to electrodeposition coating as anodes, the steel plate is then withdrawn and the length of the coating on the plate is measured by a scale, by means of which length the throwing power of the paint is evaluated.

All of the foregoing methods, however, are only simple comparative tests and lack universality owing to an unclear knowledge of the relationship between the shape and arrangement of electrodes in an electrodeposition apparatus and the physical values measured during electrodeposition. Therefore, the throwing power of a paint can not correctly be evaluated by any of the above methods. Although it is possible to estimate the throwing power of a coating solution by the above-mentioned methods, it is impossible to detect and control the state of coating on an article to be coated actually. Therefore, it has heretofore been only possible to assess the state of coating on a surface which cannot be observed visually by breaking the coated article. However, in this process, it has been a very complicated and difficult matter to determine how to set the conditions for coating the desired surfaces.

On the other hand, the real state of circumstance is that the adjustment of the concentration of a coating solution, the coating voltage, the coating time and the like in the electrodeposition coating step which is operated on the basis of the information obtained in accordance with the foregoing methods requires much time and much labour because said information can not be associated with an automatic measuring apparatus since said information is not quantitative and unclear in correspondence to the electrodeposition conditions of the coating solution.

The present inventors have found from the clarification of electrodeposition coating mechanism occurring on a steel pipe that the amount of paint electrodeposited on the inside surface of the steel pipe is independent of that on the outside surface of the steel pipe, and that the amount of paint coated on a metal article in an enclosed system such as the inside surface of a steel pipe is a function of a geometrical configuration of the enclosed system, the applied voltage and current at the time of electrodeposition and the electro-conductivity of electrodeposition coating solution, although it was heretofore considered that the amount of paint coated on the inside surface of a steel pipe depended upon the electrodeposition state on the outside surface of the steel pipe and that an electrodeposition on the outside surface thereof is first carried out and when the resistance between the electrodes has been increased thereby, the electrodeposition on the inside surfaces thereof begins to proceed.

The object of the present invention is to provide a process for measuring the state of coating on inaccessible interior surface of structure in electrodeposition coating on the basis of the foregoing fresh fact.

According to the present invention there is provided a method of electrodeposition coating in which the formation of an electrodeposited coating on a metallic object is detected by simultaneously effecting electrodeposition coating of the object and a metallic electrode located in the neighbourhood of but separated by the electrodeposition solution from the object, the metallic electrode being at the same polarity as the object and having a surface area sufficiently smaller than that of the object, and detecting a peak value of the current passing through the metallic electrode during the electrodeposition.

Figure 2:
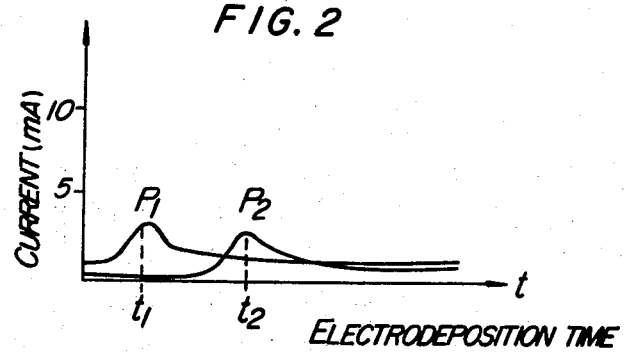

The present invention will be explained hereinbelow, referring to the accompanying drawings, in which FIG. 1 is an explanatory drawing showing an embodiment of the present invention, and FIG. 2 shows a current-time curve obtained in Example 1.

An explanation will be made of a process for measuring the state of coating on the inside surface of a structure with respect to the measurement of a throwing power.

One of the characteristics of the present measuring process consists in that a small metallic electrode having a surface area sufficiently smaller than that of a material to be coated is provided as an anode separated from the material to be coated through a coating solution and a circuit thereof is arranged in parallel to that of another anode which is the material to be coated. By use of said apparatus, the condition of the coating at the position on the material near which the small metallic electrode is located and the time required for coating to be formed at this position after the commencement of electrodeposition can be determined by measuring the current passing through the small metallic electrode. Therefore, in accordance with this process, the coating of, for example, a hidden recess in an object can be detected and controlled.

The small metallic electrode referred to herein is a piece having a surface area of 1% or less based on the surface area of anode. By the selection of such a small metallic electrode, the variation in current passing through the object to be coated caused by the presence of said small electrode in the electrodeposition cell can be reduced to 1% or less. The provision of said circuit is conceivable from the discovery that a position at which the inside surface of material to be coated is coated is a function of electrodeposition time and independent of the current passing through the outside surface of material to be coated, and is not inferable at all from the prior thoughts.

The symbols used in FIG. 1 indicate the following:

A: a pipe-shaped material to be coated, which is the anode of the electrodeposition cell
B: an electrodeposition coating bath, which also serves as a cathode
E: an electrodeposition coating solution
$P_1$ and $P_2$: small metallic electrodes which are insulated from A
$A_1$ and $A_2$: ammeters
S: a switch
V: a potentiometer In the circuit in FIG. 1, when S is closed, currents passing through $P_1$ and $P_2$ are independent of the current passing through A, and are suddenly increased after the lapse of time $t_1$ in an ammeter $A_1$ and after the lapse of time $t_2$ in an ammeter $A_2$ as shown in FIG. 2, and thereafter lowered within a short period of time. After the commencement of the electrodeposition and the lapse of time $t_1$ and $t_2$, the currents pass through $A_1$ and $A_2$ to cause electrodeposition on $P_1$ and $P_2$, respectively, and thereafter, the currents are lowered due to the resistance of electrodeposition coatings formed on $P_1$ and $P_2$. The lines connecting $P_1$ with $A_1$ and $P_2$ with $A_2$ are insulated from E. It was confirmed that after the lapse of time $t_1$ or $t_2$, the inside surface of the material to be coated had been coated from the lower end to $P_1$ or $P_2$, respectively. Further, it was confirmed that the small metallic electrode at the position at which no sudden increase in current was shown had not been coated. The use of a current-time self-recording meter in place of the ammeter $A_1$ is convenient for enabling the detailed analysis of condition of the electrodeposition coating of the interior surface of the object from the state, position and increase of current. Further, the coatable highest position can be confirmed by use of a plurality of small metallic electrodes spaced along the interior surfaces connecting the respective circuits in parallel, effecting electrodeposition and detecting the current-time curves of each electrode for a peak value.

EXAMPLE 1

Small metallic electrodes $P_1$ and $P_2$ (surface area: 0.5 cm.²) were fitted to the respective ends of insulated and covered conductive wires, inserted into a metallic pipe A (length: 30 cm., inside diameter: 1.8 cm.) and connected into an electric circuit as shown in FIG. 1. The positions of $P_1$ and $P_2$ were set 5 cm. and 10 cm. from the bottom of pipe, respectively, under the guide of marks put in advance on the conductive wires. A current-time recorder was used as $A_1$. When the electrodeposition coating was carried out at a coating solution temperature of 30° C. at an applied voltage of 100 v., curves as shown in FIG. 2 were obtained, from which it was found that the electrodeposition coating had been effected up to the respective positions of the electrodes $P_1$ and $P_2$ on the internal surface of the pipe after 35 seconds and 120 seconds, respectively. Observing the pipe cut open after electrodeposition, it was confirmed that the above measurement was correct.

The composition of paint used in this example was as follows:

| | Parts by weight |
|---|---|
| Maleic acid-modified linseed oil resin neutralized with organic amine | 8.5 |
| Carbon black | 0.45 |
| Strontium chromate | 0.05 |
| Dispersing agent | 0.01 |
| Pure water | 91.00 |
| Total | 100.01 |

EXAMPLE 2

A measurement of the state of electrodeposition coating was carried out using the same measuring apparatus and paint solution in the electrodeposition cell as in Example 1. A peak current was detected after the lapse of 45 seconds through a small metallic electrode at the position $P_1$ but no peak current could be detected after the lapse of 120 seconds through a small metallic electrode at the position $P_2$ and no coating was formed thereon. On measuring the current passing through the small metallic electrode at the position $P_2$ while stirring a replenishing paint solution into the electrodeposition cell, it was found that the current passed through the small metallic electrode at the position $P_2$ after the lapse of 115 seconds and when 12% of the amount of original coating solution had been added to the cell as the replenishing solution. In such a manner, the control of coating solution in the electrodeposition cell is possible. The composition of replenishing coating solution was the same as that of the coating solution in Example 1.

What we claim is:

1. A method for determining a throwing power, characterized by providing a small electrode of metal as an anode in the neighbourhood of but separated by an electrodeposition coating solution from, a part of a material to be coated at which part a visual estimation of coating is difficult, said small electrode having a surface area sufficiently smaller than that of the material to be coated, simultaneously effecting electrodeposition-coating of the small electrode and the material to be coated, and measuring the current value at a peak detected by the small electrode.

2. A method according to claim 1, wherein peak values of the currents passing through each of a plurality of metallic electrodes are detected, each metallic electrode being connected in parallel with the others and with the material to be coated, each electrode being located in the neighbourhood of but separated by the electrodeposition coating solution from a respective part of the surface of the material to be coated and each metallic electrode having a surface area sufficiently smaller than that of the material.

3. A method according to claim 1, wherein the surface area of the metallic electrode is 1% or less of the surface area of the material to be coated.

4. A method according to claim 2, wherein the surface area of each metallic electrode is 1% or less of the surface area of the material to be coated.

References Cited

UNITED STATES PATENTS

| | | | |
|---|---|---|---|
| 3,476,667 | 11/1969 | Gilchrist | 204—181 |
| 3,483,097 | 12/1969 | Bush et al. | 204—181 X |
| 3,660,266 | 5/1972 | Koch II, et al. | 204—300 |

FOREIGN PATENTS

| | | | |
|---|---|---|---|
| 970,506 | 9/1964 | Great Britain | 204—181 |

OTHER REFERENCES

Yeates, "Electropainting," Throwing Power, Draper, Ltd. (1966), pp. 41–53.

JOHN H. MACK, Primary Examiner

A. C. PRESCOTT, Assistant Examiner

U.S. Cl. X.R.

204—181, 299